(12) United States Patent
Zandparsa

(10) Patent No.: US 7,806,456 B1
(45) Date of Patent: Oct. 5, 2010

(54) FUEL CAP SMART VEHICLE SELECTOR LEVER

(76) Inventor: Kumars Zandparsa, 1516 W. 1st St., Apt. 315, San Pedro, CA (US) 90732

(*) Notice: Subject to any disclaimer, the term of this patent is extended or adjusted under 35 U.S.C. 154(b) by 0 days.

(21) Appl. No.: 12/082,655

(22) Filed: Apr. 14, 2008

(51) Int. Cl.
*B60K 15/05* (2006.01)
(52) U.S. Cl. .................................. 296/97.22; 220/86.2
(58) Field of Classification Search .............. 296/97.22; 220/86.2
See application file for complete search history.

(56) References Cited

U.S. PATENT DOCUMENTS

| | | | |
|---|---|---|---|
| 2,163,292 A | 6/1939 | Sassoon et al. | |
| 2,166,060 A | 7/1939 | Kirk | |
| 2,480,083 A | 8/1949 | McMillan | |
| 3,026,004 A | 3/1962 | Rowell | |
| 3,788,685 A | 1/1974 | Leichtl | |
| 3,912,311 A | 10/1975 | Carvell | |
| 4,331,353 A | 5/1982 | Yazawa | |
| 4,374,597 A | 2/1983 | Mochida | |
| 4,620,744 A | 11/1986 | Yuri | |
| 4,633,724 A * | 1/1987 | Mochida | 74/471 R |
| 4,942,937 A | 7/1990 | Amberger | |
| 5,253,920 A | 10/1993 | Eldridge | |
| 5,329,164 A | 7/1994 | Saito | |
| 5,451,927 A | 9/1995 | Thompson | |
| 5,454,618 A | 10/1995 | Sullivan | |
| 5,520,431 A | 5/1996 | Kapes | |
| 5,635,770 A | 6/1997 | Evans, Jr. | |
| 5,769,481 A * | 6/1998 | Cooper | 296/97.22 |
| 5,988,238 A | 11/1999 | Palvolgyi | |
| 6,021,823 A | 2/2000 | Hale | |
| 6,081,042 A | 6/2000 | Tabata | |
| 6,098,733 A | 8/2000 | Ibaraki | |
| 6,114,775 A | 9/2000 | Chung | |
| 6,176,807 B1 | 1/2001 | Oba | |
| 6,234,557 B1 * | 5/2001 | Bae | 296/97.22 |
| 6,712,171 B2 | 3/2004 | Farmer | |
| 6,834,688 B2 * | 12/2004 | Ono et al. | 141/94 |
| 6,990,945 B1 * | 1/2006 | Kropinski et al. | 123/198 D |
| 7,051,831 B2 * | 5/2006 | Scholer et al. | 180/286 |
| 2002/0145303 A1 * | 10/2002 | Son | 296/97.22 |
| 2003/0037981 A1 * | 2/2003 | Scholer et al. | 180/271 |
| 2003/0150417 A1 | 8/2003 | Miwa | |
| 2003/0222476 A1 * | 12/2003 | Park | 296/97.22 |
| 2004/0011583 A1 * | 1/2004 | Scholer et al. | 180/286 |
| 2007/0257505 A1 * | 11/2007 | Tseng et al. | 296/97.22 |

FOREIGN PATENT DOCUMENTS

| | | |
|---|---|---|
| EP | 0032378 B1 | 12/1984 |
| EP | 0102481 B1 | 3/1986 |
| GB | 2039319 A | 8/1980 |
| JP | 09254670 A | 9/1997 |

* cited by examiner

*Primary Examiner*—Jason S Morrow
(74) *Attorney, Agent, or Firm*—Tope-McKay & Associates; Marcus Risso

(57) ABSTRACT

Method and apparatus are provided for limiting vehicle selector lever operation during fueling. The apparatus comprises, two levers for detecting whether (i) the vehicle selector lever is in the park position, and (ii) a cap is on the vehicle fuel filler pipe, two locking keys coupled to the levers receiving information therefrom to enable or disable the vehicle selector lever and fuel filler lid depending upon the lever outputs, thereby, disabling the vehicle fuel filler lid when the vehicle selector lever is not in park position and disabling the vehicle selector lever when a cap is not on the vehicle fuel filler pipe.

4 Claims, 8 Drawing Sheets

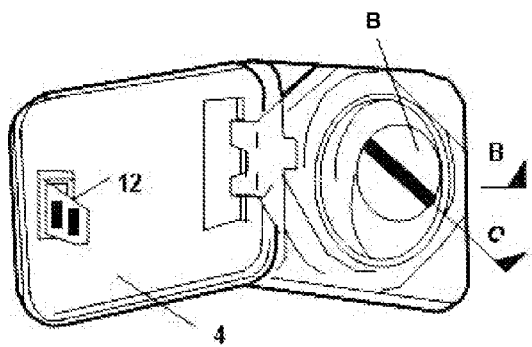
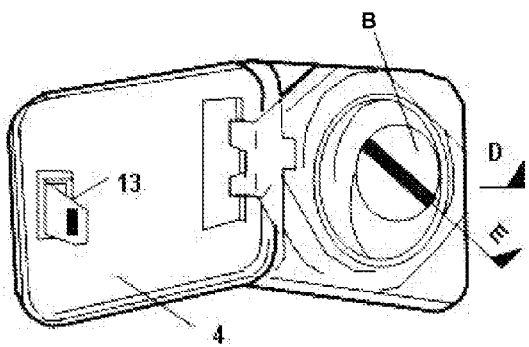
FIG. 4A
FIG. 4B
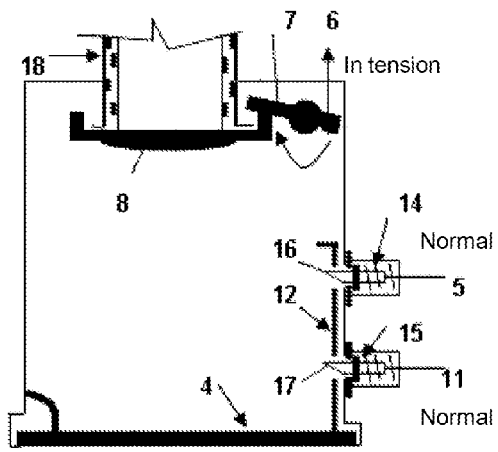
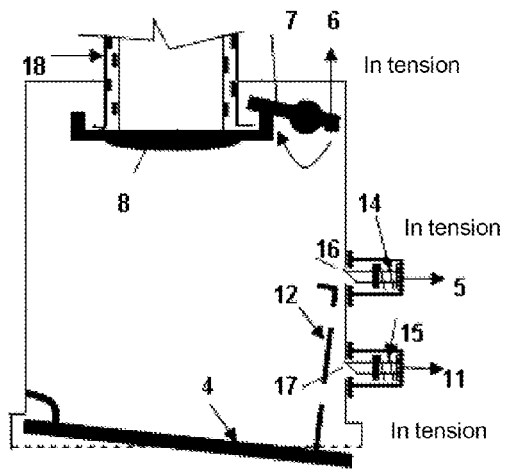
FIG. 5A
FIG. 5B

FUEL CAP SMART VEHICLE SELECTOR LEVER

FIELD OF THE INVENTION

The invention generally relates to vehicle fueling safety and, more particularly, to disabling the operation of a vehicle selector lever during fueling without forcing the engine off.

BACKGROUND OF THE INVENTION

Most fueling stations are self-service and customers may drive their cars right after fueling without removing the pump nozzle.

Accordingly, it is desirable to provide an apparatus and method that disables the vehicle selector lever when fueling, or when fueling is about to take place. In addition, it is desirable that the fueling safety system automatically reset so that the vehicle selector lever can once again be operated. Other desirable features and characteristics of the invention will be apparent from the following descriptions and the appended claims, taken in conjunction with the accompanying drawings.

A number of attempts have been made in the prior art to improve safe fueling procedures. Some examples include the disclosures of the following U.S. Pat. Nos.:

U.S. Pat. No. 6,990,945 (Kropinski)
U.S. Pat. No. 6,631,577 (Madison).

These patents describe various methods and types of apparatuses for limiting engine operation during fueling for safety purposes by turning on a visual warning during the ongoing fueling operation.

OBJECTS OF THE INVENTION

It is an object of this invention, in the field of safe vehicle fueling, to provide an improved fueling assembly for fueling conventional vehicles without requiring costly retrofitting of the vehicle.

SUMMARY OF THE INVENTION

An apparatus is provided for limiting vehicle selector lever operation during fueling. The apparatus comprises, two levers for detecting whether (i) the vehicle selector lever is in the park position, and (ii) a cap is on the vehicle fuel filler pipe. Two locking keys coupled to the levers receive information therefrom to enable or disable the vehicle selector lever and a fuel filler lid depending upon the lever outputs, thereby, disabling the vehicle fuel filler lid when the vehicle selector lever is not in park position and disabling the vehicle selector lever when a cap is not on the vehicle fuel filler pipe.

A method is provided for limiting the vehicle selector lever operation during fueling. In a first embodiment, the method comprises determining whether a vehicle selector lever is in the park position, and if so, whether the vehicle fuel filler lid is open, and if so, whether a cap is on the vehicle fuel filler pipe, and if not, disabling operation of the vehicle selector lever. If the vehicle selector lever is not in a park position, the opening of the vehicle fuel filler lid is disabled. This invention has a mechanical base not electrical, so it would be easy to install and without a need for electricity.

BRIEF DESCRIPTION OF THE DRAWINGS

The present invention will hereinafter be described in conjunction with the following drawing figures. The invention will be readily understood from the descriptions and drawings. In the drawings:

FIGS. 4A-B illustrate a vehicle fuel filler lid equipped with either a double slot clamp (if equipped with the fuel filler lid opener lever inside the car) or a one slot clamp (if not equipped with the fuel filler lid opener lever inside the car).

FIGS. 5A-B illustrate cross-sectional views of a vehicle fuel filler lid in closed and opened positions with a double slot clamp (if equipped with the fuel filler lid opener lever inside the car) along with the springs, locking keys, cables, vehicle selector lever enabling lever, and a cap that is closed over the vehicle fuel filler pipe (enabling the vehicle selector lever).

DETAILED DESCRIPTION OF PREFERRED EMBODIMENTS

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
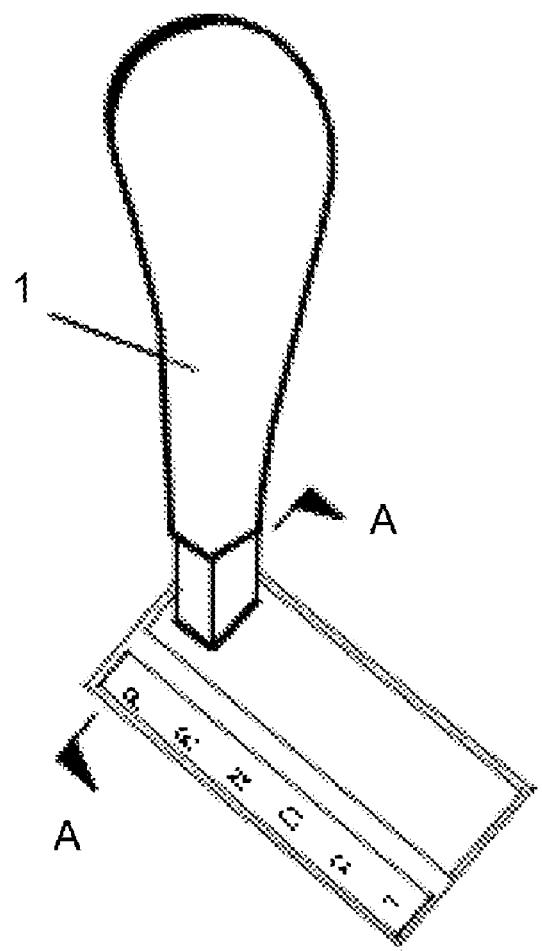
FIG. 1 illustrates a selector lever of a vehicle in a park position.

FIG. 1 illustrates a vehicle selector lever 1 of a vehicle in a park position for fueling operation. The fueling operation cannot be started if the selector lever 1 is not in the park position according to the present invention.

FIGS. 2A-B, C illustrate cross-sectional views of a vehicle selector lever 1 in park and drive positions, and a fuel filler lid enabling lever 2 for enabling or disabling the fuel filler lid opener lever 3 (in FIG. 3) inside the car (if equipped), and/or locking or unlocking the fuel filler lid 4 (in FIG. 4) according to the present invention. With these simple devices, the fueling operations cannot be started, if the vehicle selector lever 1 is not in the park position for safety purposes.

Figure 2:
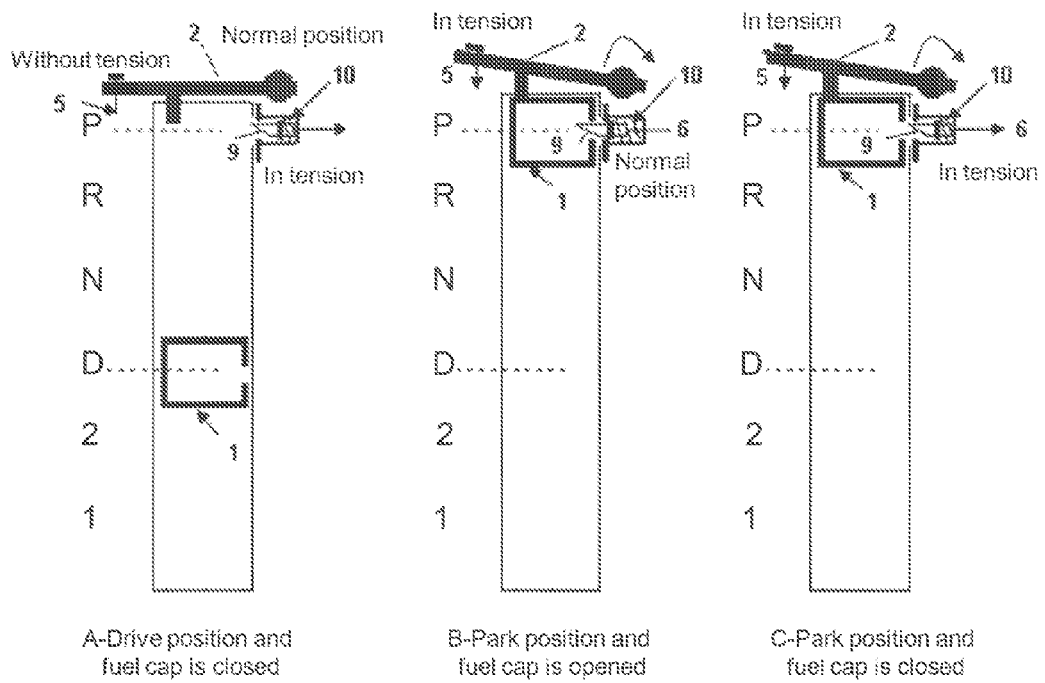
FIGS. 2A-B, and C illustrate cross-sectional views of a vehicle selector lever in park and drive positions, a selector lever locking key, and a fuel filler lid enabling lever according to the present invention for enabling or disabling the fuel filler lid opener lever inside the car (if equipped) and/or unlocking or locking the vehicle fuel filler lid, if it is not equipped with a fuel filler lid opener lever inside the car.

An attached cable 5 to a fuel filler lid enabling lever 2 (FIG. 2) would be in tension only if the vehicle selector lever 1 is in park position (as shown in FIGS. 2B, C). In this case, a fuel filler lid opener lever 3 (in FIG. 3) inside the car (if equipped) will be enabled, or a fuel filler lid 4 (in FIG. 4) will be unlocked and can be opened manually (if not equipped with the fuel filler lid opener inside the car).

Figure 6A:
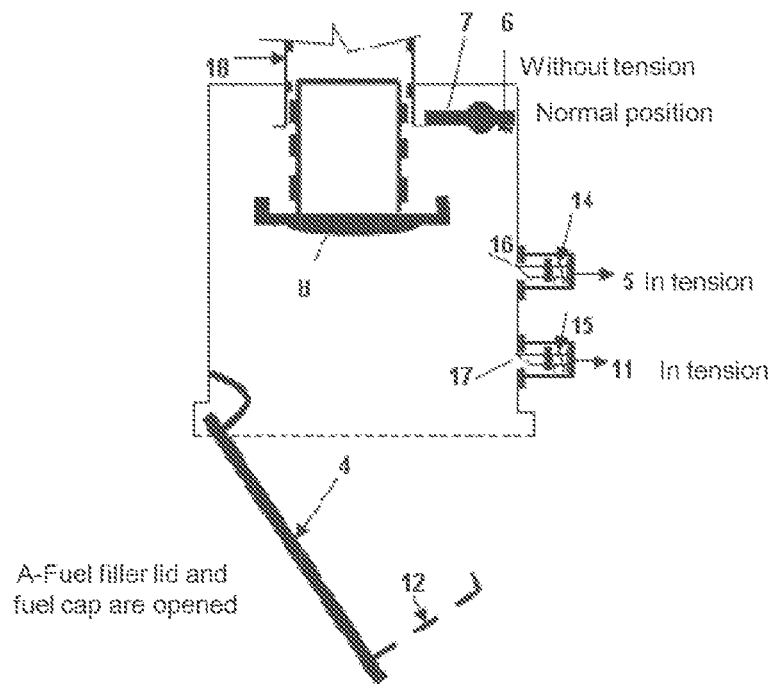
FIGS. 6A-B illustrate cross-sectional views of a vehicle fuel filler lid in an opened position with a double slot clamp (if equipped with the fuel filler lid opener lever inside the car) along with the springs, locking keys, cables, and a vehicle selector lever enabling lever when a cap is off and on the vehicle fuel filler pipe (disabling or enabling the vehicle selector lever operations respectively).
Figure 8A:
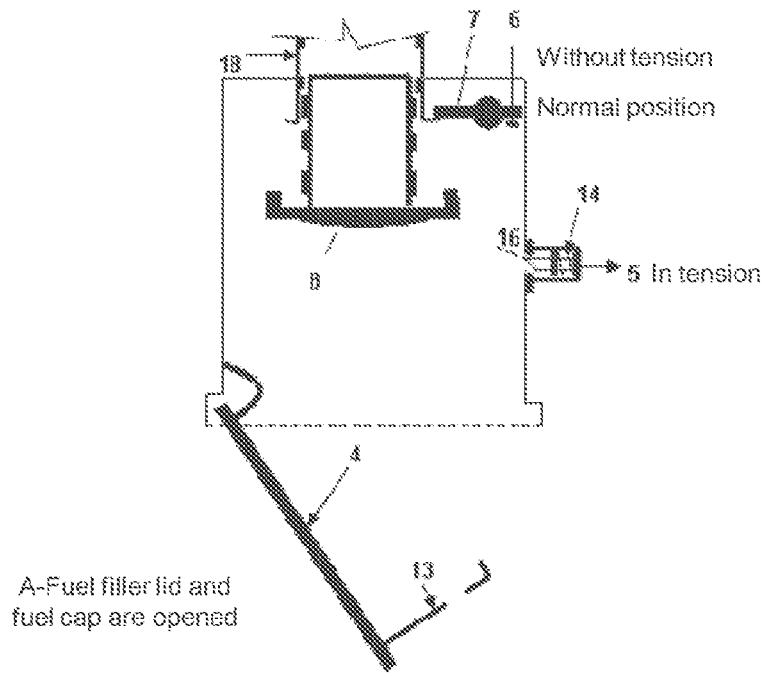
FIGS. 8A-B illustrate cross-sectional views of a vehicle fuel filler lid in an opened position with a single slot clamp (if not equipped with the fuel filler lid opener lever inside the car) along with the spring, locking key, cable and vehicle selector lever enabling lever when a cap is off and on the vehicle fuel filler pipe (disabling or enabling the vehicle selector lever operations respectively).

A cable 6 (FIG. 2) from a vehicle selector lever enabling lever 7 (as shown in FIG. 5) would be in tension if the fuel filler cap 8 is closed (as shown in FIG. 5), and would be in normal position (without tension) if the fuel filler cap 8 is opened (as shown in FIGS. 6A, 8A). Thus, the vehicle selector lever 1 has to be in a park position, otherwise the fuel filler lid 4 cannot be opened. If the fuel filler cap 8 is opened (as shown in FIGS. 6A, 8A), the vehicle selector lever 1 would be disabled by a locking key 9 (as shown in FIG. 2B).

A spring 10 (FIG. 2) turns the locking key 9 to a normal position (as shown in FIG. 2B) after opening the fuel filler cap 8 (as shown in FIGS. 6A, 8A) and, in this case, the cable 6 will be without tension.

Figure 3:
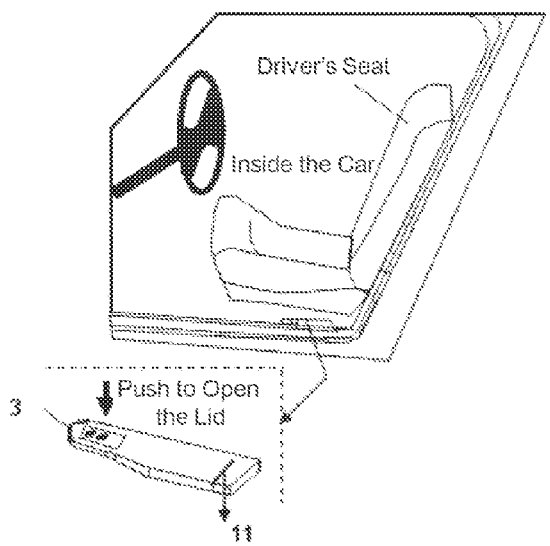
FIG. 3 illustrates a fuel filler lid opener lever inside the car (if equipped).

FIG. 3 illustrates a fuel filler lid opener lever 3 inside the car (if equipped) along with a cable 11 that allows opening of the fuel filler lid 4 (as shown in FIG. 5B) provided that the vehicle selector lever 1 is in a park position.

FIGS. 4A-B illustrate a fuel filler lid 4 equipped with either a double slot clamp 12 (if equipped with the fuel filler lid opener lever 3 inside the car), or a one slot clamp 13 (if not equipped with the fuel filler lid opener lever 3 inside the car) according to the present invention. Sections B-B, C-C, D-D, and E-E in FIG. 4 show the invisible details, which are illustrated in FIGS. 5, 6, 7, and 8.

FIGS. 5A-B illustrate cross-sectional views of a fuel filler lid 4 in closed and opened positions and a double slot clamp 12 (if equipped with the fuel filler lid opener lever 3 inside the car) along with two springs 14 and 15 and two cables 5 and 11 from a fuel filler lid enabling lever 2 (in FIG. 2) and a fuel filler lid opener lever 3 inside the car (in FIG. 3), respectively. The fuel filler lid 4 can be opened (as shown in FIG. 5B) by the fuel filler lid opener lever 3 inside the car (in FIG. 3) if and only if the vehicle selector lever 1 is in a park position (as shown in FIGS. 2B, C).

The springs 14 and 15 turn the locking keys 16 and 17 to a normal position (as shown in FIG. 5A) if the vehicle selector lever 1 is not in a park position (as shown in FIG. 2A) and the fuel filler lid opener lever 3 inside the car is released, respectively.

Figure 6B:
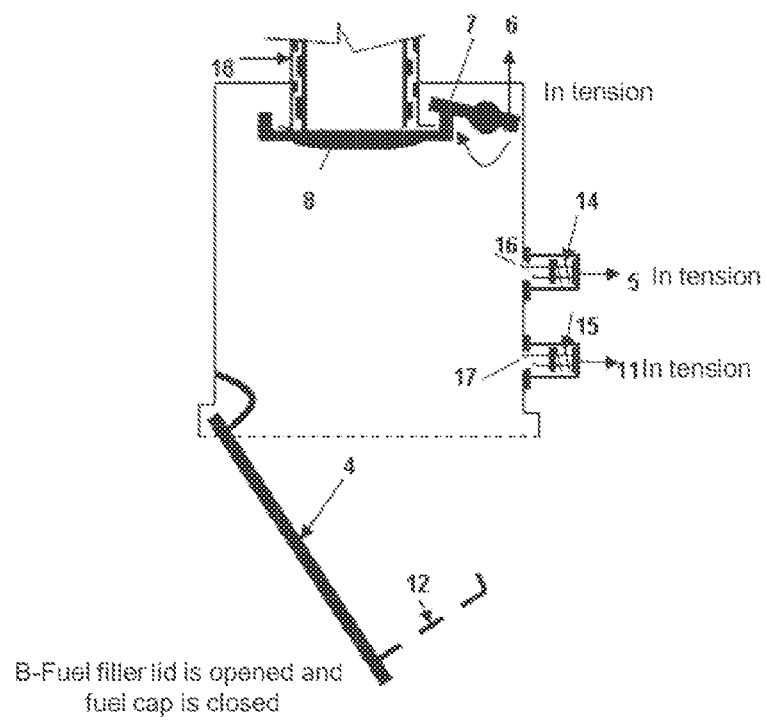

FIGS. 6A-B illustrate cross-sectional views of a fuel filler cap 8, a fuel filler pipe 18, a vehicle selector lever enabling lever 7, a cable 6 that is connected to the vehicle selector lever locking key 9 (in FIG. 2), and a double slot clamp 12. Other cables and springs are described above.

FIG. 6A (the fuel filler lid 4 and the fuel filler cap 8 are opened) illustrates the vehicle selector lever enabling lever 7 in a normal position without tension in cable 6 that disables the vehicle selector lever 1 by pushing forward the selector lever locking key 9 by a spring 10 (as shown in FIG. 2B).

FIG. 6B illustrates a selector lever enabling lever 7 when the fuel filler lid 4 is opened and the fuel filler cap 8 is closed. In this case, the cable 6 would be in tension, so the vehicle selector lever 1 will be enabled by pulling back the selector lever locking key 9 (as shown in FIGS. 2A,C). The cable 11 will turn to a normal position (without tension) after releasing the fuel filler lid opener lever 3 inside the car.

Figures 7A, 7B:
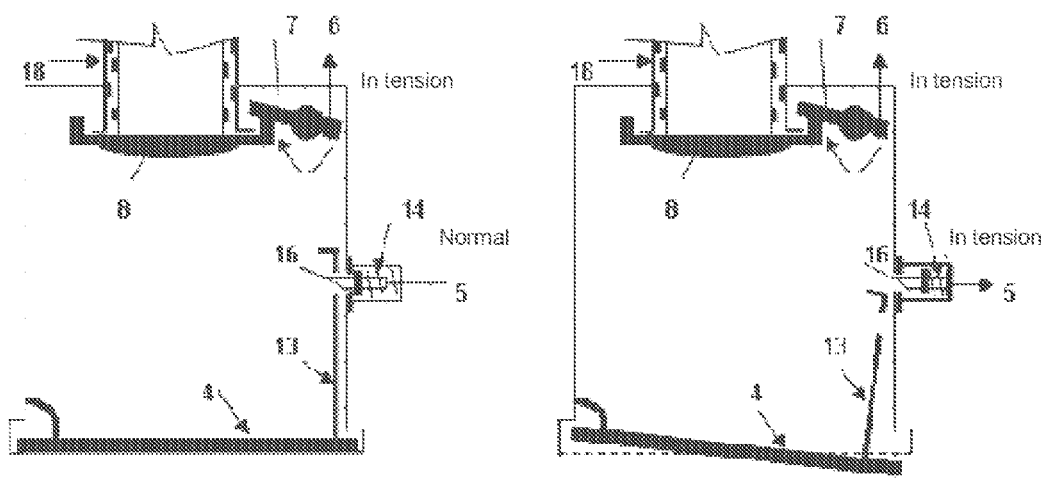
FIGS. 7A-B illustrate cross-sectional views of a vehicle fuel filler lid in closed and opened positions with a single slot clamp (if not equipped with the fuel filler lid opener lever inside the car) along with the spring, locking key, cable, vehicle selector lever enabling lever, and a cap that is closed over the vehicle fuel filler pipe (enabling the vehicle selector lever).

FIGS. 7A-B illustrate cross-sectional views of a fuel filler lid 4 in closed and opened positions, a vehicle fuel filler cap 8 in a closed position, a one slot clamp 13 (if not equipped with a fuel filler lid opener lever 3 inside the car) along with a spring 14, and two cables 5 and 6 that are attached to the fuel filler lid enabling lever 2 and the vehicle selector lever locking key 9 (as shown in FIG. 2), respectively.

The fuel filler lid 4 (FIG. 7B) can be opened manually if and only if the vehicle selector lever 1 is in a park position (as shown in FIGS. 2B, C). The spring 14 turns the locking key 16 to a normal position if the vehicle selector lever 1 is not in a park position (as shown in FIG. 2A).

Figure 8B:
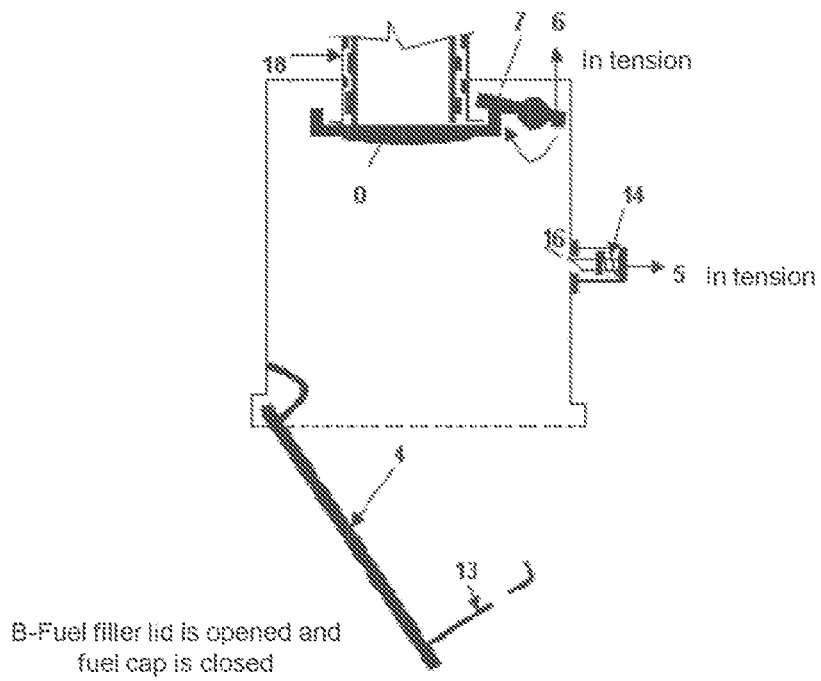

FIGS. 8A-B illustrate cross-sectional views of a fuel filler cap 8, a fuel filler pipe 18, a selector lever enabling lever 7, two cables 5 and 6 that are connected to the fuel filler lid enabling lever 2 and the vehicle selector lever locking key 9 (as shown in FIG. 2), respectively, and a one slot clamp 13.

FIG. 8A (the fuel filler lid 4 and the fuel filler cap 8 are opened) illustrates the vehicle selector lever enabling lever 7 in a normal position without tension in the cable 6 that disables the vehicle selector lever 1 by pushing forward the vehicle selector lever locking key 9 by the spring 10 (as shown in FIG. 2B). FIG. 8B shows the selector lever enabling lever 7 when the fuel filler lid 4 is opened, and the fuel filler cap 8 is closed (cable 6 is in tension), so the vehicle selector lever 1 will be enabled by pulling back the vehicle selector lever locking key 9 (as shown in FIGS. 2A,C).

Figure 9:
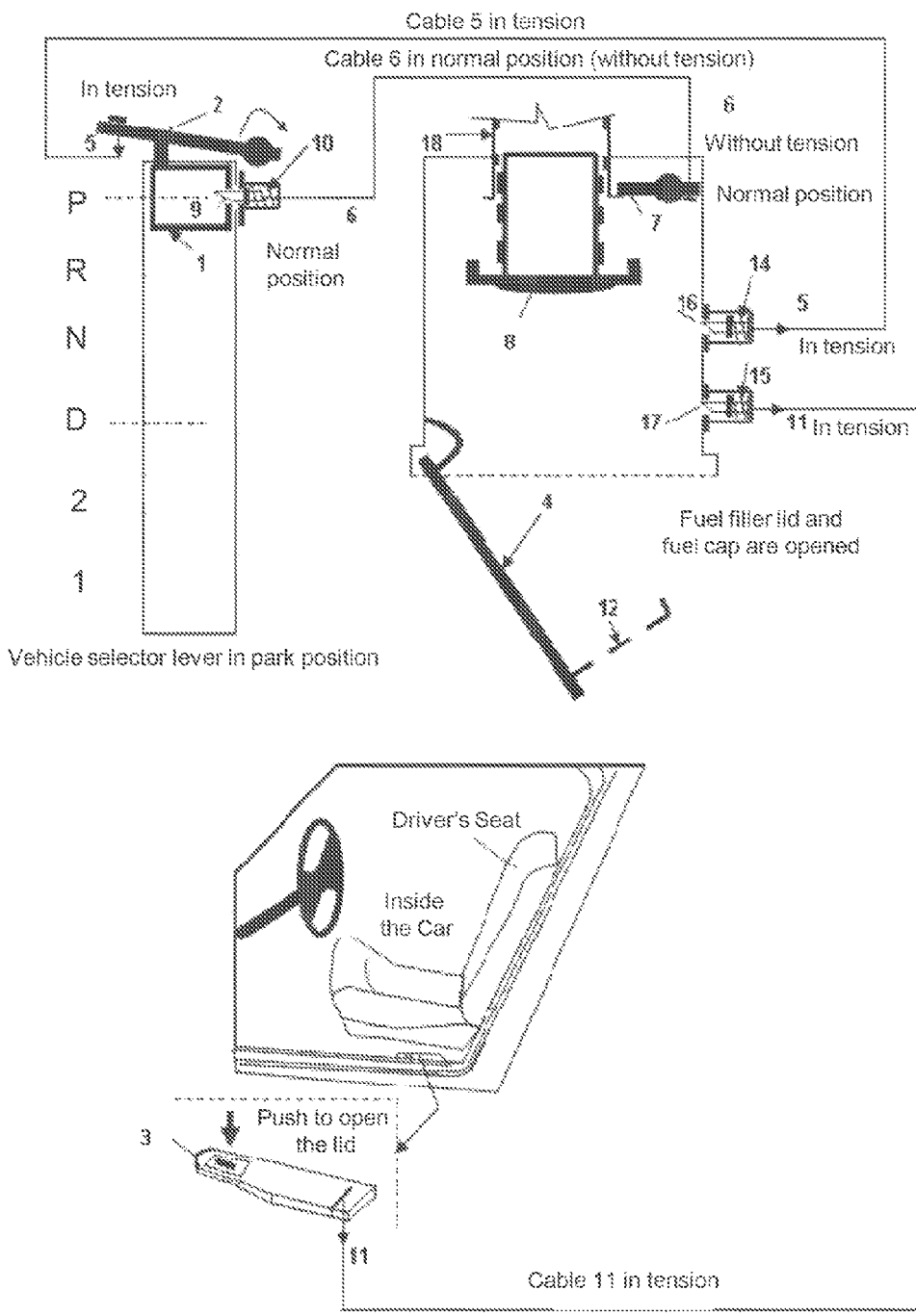
FIGS. 9 and 10 illustrate the various elements of the invention.
Figure 10:
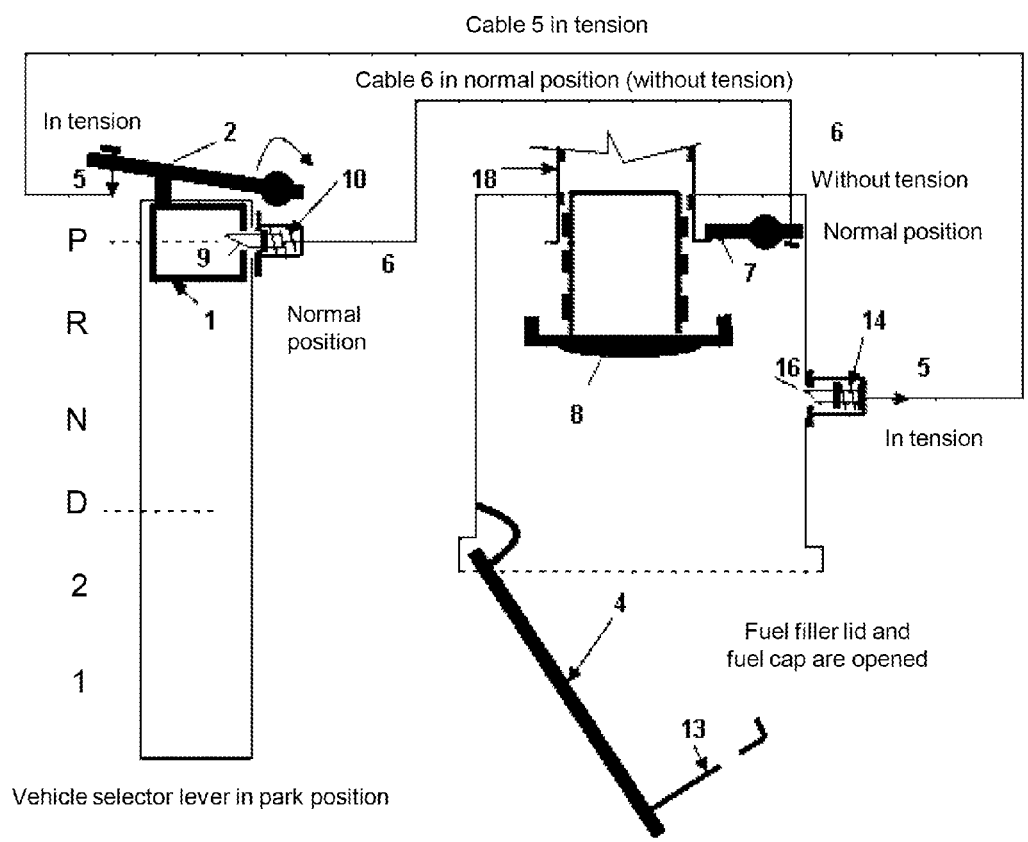

FIGS. 9 and 10 illustrate the different elements of this invention with and without a fuel filler lid opener lever 3 inside the car, respectively, to illustrate the relationship between the vehicle selector lever 1, the fuel filler lid enabling lever 2, the selector lever enabling lever 7, the vehicle fuel filler lid 4, and the fuel filler cap 8.

What I claim as my invention is:

1. A vehicle fueling safety apparatus for a vehicle having a vehicle selector lever for selecting a gear position for the vehicle, a fuel filler cap attached with a fuel filler pipe, and a fuel filler lid for providing access to the fuel filler cap, the vehicle fueling safety apparatus comprising:
   a fuel filler lid enabling lever connected with the vehicle selector lever for detecting a position of the vehicle selector lever;
   a first cable attached with the fuel filler lid enabling lever and the fuel filler lid, such that the fuel filler lid enabling lever is operatively connected with the fuel filler lid through the first cable to control operation of the fuel filler lid, such that the fuel filler lid can only be opened when the vehicle selector lever is in a park position;
   a first vehicle selector lever locking key operatively connected with the vehicle selector lever for disabling the vehicle selector lever, such that the vehicle selector lever cannot move from a park position when disabled by the first vehicle selector lever locking key;
   a vehicle selector lever enabling lever attached with the fuel filler cap for controlling operation of the fuel filler cap; and
   a second cable attached with the first vehicle selector lever locking key and the vehicle selector lever enabling lever, such that when the fuel filler cap is opened, the vehicle selector lever is disabled by the first vehicle selector lever locking key and cannot move from a park position.

2. The vehicle fueling safety apparatus as set forth in claim 1, wherein the first vehicle selector lever locking key comprises a first spring for turning the first vehicle selector lever locking key.

3. The vehicle fueling safety apparatus as set forth in claim 2, further comprising:
   a fuel filler lid opener lever inside the car for controlling the fuel filler lid;
   a double slot clamp attached with the fuel filler lid;

a second locking key comprising a second spring and a third locking key comprising a third spring, wherein the second locking key and the third locking key are positioned on the vehicle proximate the fuel filler lid and in alignment with the double slot clamp when the fuel filler lid is in a closed position, and wherein the second and third springs turn the second and third locking keys; and a third cable attached with the fuel filler lid opener lever and the fuel filler lid;

wherein the first cable is attached with the fuel filler lid through the second locking key and the third cable is attached with the fuel filler lid through the third locking key, such that the fuel filler lid can only be opened by the fuel filler lid opener lever if the vehicle selector lever is in a park position.

4. The vehicle fueling safety apparatus as set forth in claim 2, further comprising:

a one slot clamp attached with the fuel filler lid; and a second locking key comprising a second spring, wherein the second locking key is positioned on the vehicle proximate the fuel filler lid and in alignment with the one slot clamp when the fuel filler lid is in a closed position, and wherein the second spring turns the second locking key;

wherein the first cable is attached with the fuel filler lid through the second locking key, such that the fuel filler lid can only be opened if the vehicle selector lever is in a park position.

\* \* \* \* \*